United States Patent [19]

Flowers et al.

[11] 4,229,901

[45] Oct. 28, 1980

[54] FISHING HOOK WITH ENCIRCLING HOLDER FOR LIVE BAIT

[76] Inventors: Gene D. Flowers, Box 181, R.R. 2, Mulkeytown, Ill. 62865; David E. Flowers, 1011 E. Market St., Christopher, Ill. 62822

[21] Appl. No.: 932,046

[22] Filed: Aug. 7, 1978

[51] Int. Cl.³ ............................................. A01K 83/06
[52] U.S. Cl. ..................................... 43/44.4; 43/44.8
[58] Field of Search ................. 43/41, 44.2, 44.4, 44.6, 43/44.8, 41.2

[56] References Cited

U.S. PATENT DOCUMENTS

| | | | |
|---|---|---|---|
| 2,143,054 | 1/1939 | Copeland | 43/44.4 |
| 2,982,049 | 5/1961 | Yost | 43/44.4 |
| 3,046,691 | 7/1962 | Courtright | 43/44.6 |
| 3,197,912 | 8/1965 | Kramer | 43/44.4 |
| 3,372,508 | 3/1968 | Maglinger | 43/44.4 |
| 3,893,255 | 7/1975 | Hicks | 43/41 |

FOREIGN PATENT DOCUMENTS 4129 of 1903 United Kingdom ...................... 43/44.4

Primary Examiner—Nicholas P. Godici
Assistant Examiner—K. Bradford Adolphson
Attorney, Agent, or Firm—Cushman, Darby & Cushman

[57] ABSTRACT

A support provided on the hook in cooperation with a portion of the leader threaded through the hook eye provides a girdling loop harness for the bait. A leader clamp is provided on the hook shank so the loop girth can be adjusted to fit the live bait and held at the adjusted girth. A stop is provided on the leader to maintain a minimum girth for the loop even if the leader should slip relative to the clamp.

5 Claims, 4 Drawing Figures

FISHING HOOK WITH ENCIRCLING HOLDER FOR LIVE BAIT

BACKGROUND OF THE INVENTION

Since the beginning of time, fishing has been one of the most important means of obtaining food and providing pleasure for all mankind. Two of the greatest problems fishers have been confronted with are the material, equipment and methods available to catch fish. Live bait fishers all have been subjected to constant and continuous frustration because conventional hooks immediately or slowly kill the live bait they use. Also, the natural movement of the live bait necessary in attracting fish is restricted because the point and body of the conventional hooks has to penetrate and become embedded in the body of the live bait.

Presently, the direct prior art appears to be classified in U.S. P.T.O. class 43, subclasses 44.2, 44.4, 44.6, 44.8 and 41.

SUMMARY OF THE INVENTION

A support provided on the hook is cooperation with a portion of the leader threaded through the hook eye provides a girdling loop harness for the bait. A leader clamp is provided on the hook shank so the loop girth can be adjusted to fit the live bait and held at the adjusted girth. A stop is provided on the leader to maintain a minimum girth for the loop even if the leader should slip relative to the clamp.

Two embodiments are depicted and described herein. In one, the leader has a lower loop which passes through supplementary eyes on the hook which constitute the support. The clamp is a spring coil and the stop is a knot on the leader lower loop that is too large to pass through a respective eye of the support. In the other embodiment, the loop is provided by a wicket-like support, onto which a transparent triangular strap on the leader lower end buttons. The upper apical region of the strap provides the stop, and the clamp is a spring coil as with the first embodiment.

The principles of the invention will be further discussed with reference to the drawings wherein preferred embodiments are shown. The specifics illustrated in the drawings are intended to exemplify, rather than limit, aspects of the invention as defined in the claims.

DETAILED DESCRIPTION OF THE PRESENTLY PREFERRED EMBODIMENTS OF THE INVENTION

Figure 1:
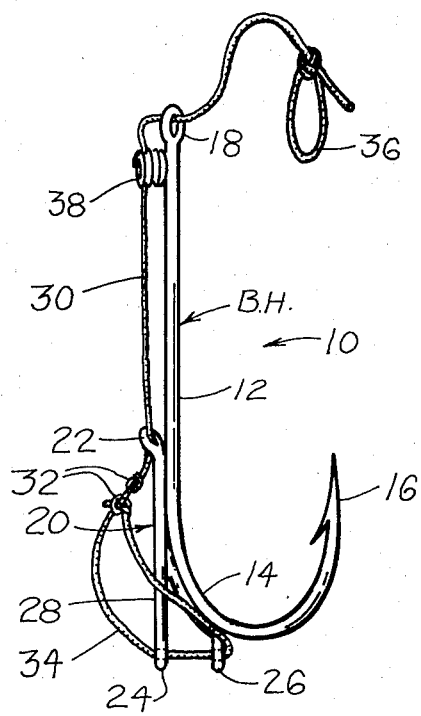
FIG. 1 is a front elevational view of a first embodiment of the hook.
Figure 2:
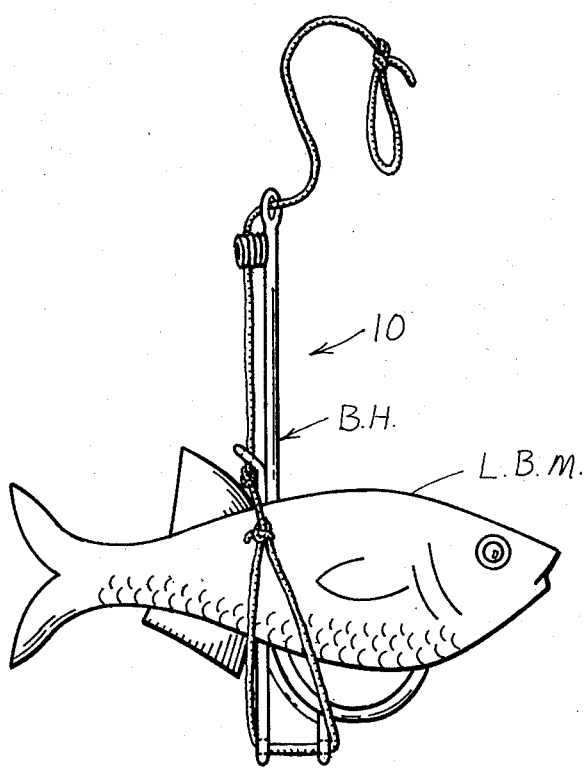
FIG. 2 is a front elevational view of the first embodiment of the hook, showing a live bait minnow harnessed against the hook without being pierced thereby.
Figure 3:
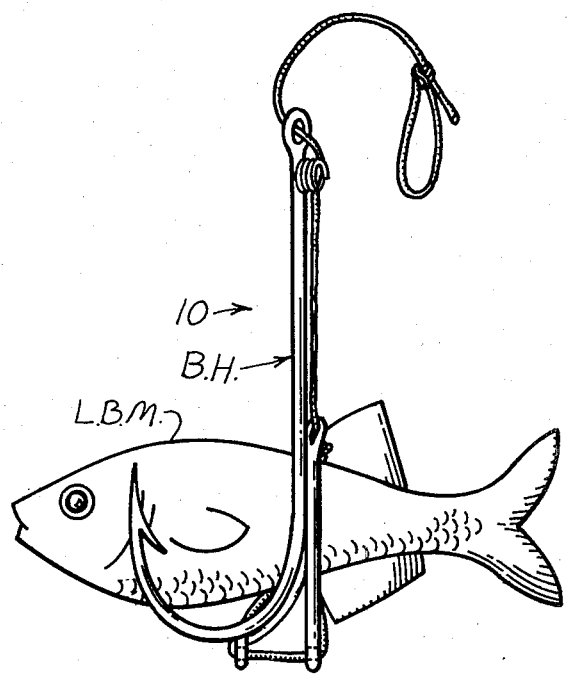
FIG. 3 is a rear elevational view of the subject matter of FIG. 2.

A first embodiment of the hook of the present invention is shown at 10 in FIGS. 1–3. The basic structure B.H. of a conventional hook remains: a shank 12 with a curved lower portion 14 that terminates in a barbed point 16. At the upper end, the hook shank 12 is provided with an eye 18 so that the hook may be attached via a leader to a fishing line.

In the present instance, the basic hook is further provided with a bait support structure 20. As shown, this includes a third eye 26 secured below the middle of the curved portion 14, a second eye 24 secured at about the same level as that of the third eye 26 but below the shank 12, and a first eye 22 secured generally midway up the shank. For convenience in manufacture by the inventor's present method, the eyes 22, 24 and 26 are provided on a wire rod armature 28 which is, in turn, secured to the basic hook as shown, for instance by brazing. (The armature could be of different shape or constitution, or could be largely or entirely eliminated in favor of securing one, two or all three of the eyes 22, 24, 26 directly on the basic hook without departing from the principles of the present invention.)

The line leader 30 may be constituted by a length of fishing line. At its lower end, the leader 30 is, after being lead through the eyes 22, 24 and 26, in that order, led back and tied to itself in a knot 32 between the first eye 22 and the second eye 24 thus providing a flexible strap 34. The knot 32 is tied too large to pass through the first eye 22. Upwardly, beyond the first eye 22, the leader 30 passes through the eye 18 of the basic hook and terminates in an upper end structure 36, such as a loop, by which the leadered hook may be secured to a fishing line (not shown).

Between the first eye 22 and the eye 18 of the basic hook, a clamp is provided, here in the form of several turns of a spring coil 38 having one end secured, e.g. by brazing, to the shank of the basic hook.

In use, a live bait minnow or the like L.B.M. is slipped through the girth-encircling loop cooperatively defined by the bait support structure 20 and the leader strap 34 until the live bait is encircled about midway along its body. The leader 30 is then pulled upwards until the loop has constricted by shortening of the strap 34 sufficiently to hold the live bait securely without garroting it too near to the point of expiration. For a minimum-girth L.B.M., sufficient constriction will occur just as the knot 32 reaches the first eye 22 and acts to prevent any further constriction of the loop. For larger-girthed bait, the proper degree of constriction will be achieved before the knot 32 reaches the first eye 22. In any event, the leader 30 then may be wound around the coil spring clamp 38 two or three times or so and pulled to wedge it into the spring coils. Accordingly, when the leader is placed in tension, the clamp 38 will prevent further constriction of the bait encircling loop and thus prevent more intensive garroting of the L.B.M.

In the first preferred embodiment, arraying the first, second and third eyes 22, 24, 26 on an armature in a generally triangular array on the outside of the basic hook defines with the basic hook an imaginary plane which helps keep the L.B.M. properly oriented and juxtaposed relative to the basic hook without need for impaling the L.B.M. on the hook.

The minnow L.B.M., as supported, may be compared to a man suspended from his belt. He can wriggle his extremities vigorously, but he cannot get away even though he is not grasped about his middle very tightly.

Figure 4:
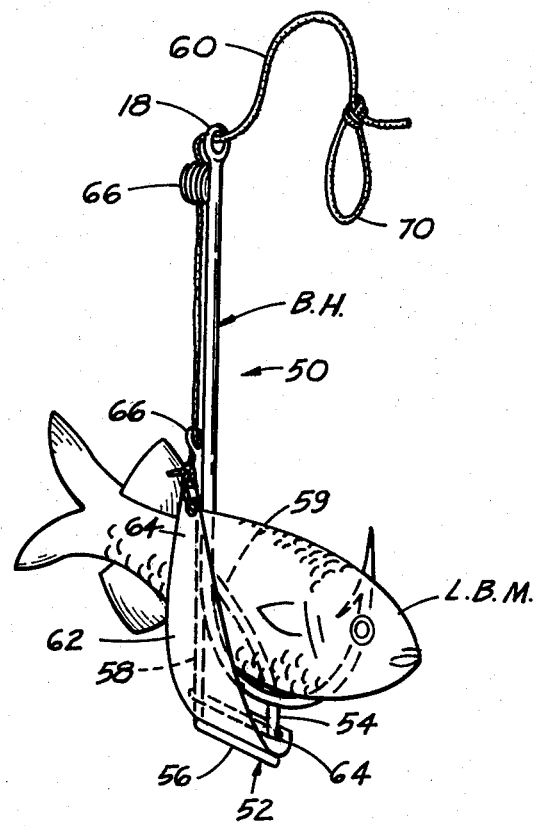
FIG. 4 is a perspective view of a second embodiment.

The second version 50 of the hook of the invention, shown in FIG. 4, also may be based on a basic hook B.H., having the same elements as above.

A wire rod wicket 52 is secured on the basic hook so that it loops below the curved portion from a first base leg 54, along a generally horizontal rail 56 and up a second base leg 58, the latter being generally in line with the shank of the basic hook. A brace 59 secured at both ends to the basic hook may be provided extending generally between the base of the basic hook shank and the base of the first wicket leg 54.

The leader 60 is a length of fishing line or the like having a generally triangular tag-like band or strap 62, e.g. made of flexible transparent plastic sheet material secured on the lower end thereof. The strap has a button-hole like slot 64 therethrough adjacent and parallel to its lower edge. At its upper end, the strap 62 tapers generally to a point 64 where the strap is connected to the filamentary portion of the leader.

The basic hook B.H. is provided with an eye 66 that is comparable to the first eye 22 on the FIGS. 1 and 2 embodiment, and a clamp 68 that is similar, if not identical, to the clamp 38 of the FIGS. 1 and 2 embodiment.

The adjustable loop for harnessing a live bait individual such as a minnow L.B.M. to the second embodiment 50 is constituted by "buttoning" the wicket 22 into the slot 64, wrapping the strap 62 across one side of the wicket and basic hook, inserting the leader 60 through the eye 66 and through the basic hook eye 18. Beyond the eye 18, the leader 60 terminates in an upper end structure such as a loop 70 which permits the second embodiment to be fastened on a fishing line (not shown).

The minnow is inserted in the adjustable loop defined between the basic hook and support structure B.H., 52 and the strap 62, the leader is pulled up upon until the bait is secured in place but not too intensely garroted as to prevent it from wriggling for a long time, and the leader is twisted a couple of times about the clamp spring 68.

The second embodiment is also provided with stop means for preventing slicing through the live minnow should the leader slip through the clamps. In this instance, the stop means is provided by the impossibility of the apical region 64 being pulled through the eye 66.

It should now be apparent that the fishing hook with encircling holder for live bait as described hereinabove, possesses each of the attributes set forth in the specification under the heading "Summary of the Invention" hereinbefore. Because it can be modified to some extent without departing from the principles thereof as they have been outlined and explained in this specification, the present invention should be understood as encompassing all such modifications as are within the spirit and scope of the following claims.

What is claimed is:

1. A fishing hook with a girth-encircling holder for live bait, comprising:
   a basic hook including a generally vertical shank with a curved lower portion, when upright, terminating in a barbed point, said shank having an upper end provided with an eye;
   a support structure mounted on said basic hook so as to depend below said curved lower portion thereof, said support structure further including a first eye mounted on said basic hook and disposed generally midway along said shank;
   a flexible strap means secured to said support structure below said basic hook lower curved portion, and extending upwards from said basic hook lower curved portion, through said first eye of said support structure and through said eye at the upper end of said basic hook;
   said flexible strap having an upper portion constituting a fishing line leader terminating upwardly in fastening means for fastening the leader to a fishing line;
   the flexible strap having enlargement means thereon located between where said flexible strap means is secured to said support structure and said first eye; said enlargement means being sized and located to act as a positive stop for limiting the constrictability in girth of a loop that is cooperatively defined by said support structure and basic hook and said flexible strap,
   said support structure being constituted by a wire rod armature having said first eye provided thereon and further having a second eye and a third eye provided thereon so that the second and third eyes are disposed below said curved lower portion of said basic hook and at generally the same level as one another;
   the flexible strap being comprised of a section of fishing line led through said first, second and third eyes and then knotted to itself between said first and second eyes with a knot that is too large to fit through said first eye and thus constitutes said positive stop,
   so that when an individual of live bait, such as a minnow, is inserted through the loop and the loop is constricted by pulling up on the leader relative to the basic hook the enlargement acts to prevent slicing through the live bait so that the live bait is juxtaposed beside the basic hook without being impaled thereby and thus is free to wriggle though harnessed from escaping.

2. The fishing hook of claim 1, further comprising:
   leader clamp means secured to said shank above said first eye for clamping the flexible strap to said shank once the loop girth has been adjusted to harness a particular size of live bait individual to the fishing hook.

3. The fishing hook of claim 2, wherein:
   the clamp means is constituted by a coil spring of several turns, said coil spring being secured at one end thereof to said shank of said basic hook.

4. A fishing hook with a girth-encircling holder for live bait, comprising:
   a basic hook including a generally vertical shank with a curved lower portion, when upright, terminating in a barbed point, said shank having an upper end provided with an eye;
   a support structure mounted on said basic hook so as to depend below said curved lower portion thereof, said support structure further including a first eye mounted on said basic hook and disposed generally midway along said shank;
   a flexible strap means secured to said support structure below said basic hook lower curved portion, and extending upwards from said basic hook lower curved portion, through said first eye of said support structure and through said eye at the upper end of said basic hook;
   said flexible strap having an upper portion constituting a fishing line leader terminating upwardly in fastening means for fastening the leader to a fishing line;
   the flexible strap having enlargement means thereon located between where said flexible strap means is secured to said support structure and said first eye; said enlargement means being sized and located to act as a positive stop for limiting the constrictability in girth of a loop that is cooperatively defined by said support structure and basic hook and said flexible strap, said support structure being constituted by a wire rod wicket having two depending base legs and a rail extending generally horizontally between them; and the flexible strap being comprised of a tag-like generally triangular piece of flexible sheet material having a generally horizontally-elongated button hole slot formed therethrough near the lower extent thereof and having an upwardly extending apical region, the flexible strap further comprising a length of fishing line leader secured to said piece of flexible sheet material in said apical region thereof, the wicket being inserted through said button hole slot and said leader being threaded upwards through said first eye, so that the apical region of said piece of flexible sheet material constitutes said positive stop;

so that when an individual of live bait, such as a minnow, is inserted through the loop and the loop is constricted by pulling up on the leader relative to the basic hook, the enlargement acts to prevent slicing through the live bait so that the live bait is juxtaposed beside the basic hook without being impaled thereby and thus is free to wriggle though harnessed from escaping.

5. The fishing hook of claim 4, wherein:

said piece of flexible sheet material is constituted by flexible transparent plastic material so as not to obscure the individual of live bait cooperatively held against the basic hook and support structure thereby.

* * * * *